(12) United States Patent
Thomsen

(10) Patent No.: US 7,797,320 B2
(45) Date of Patent: Sep. 14, 2010

(54) DIMENSIONALITY REDUCTION

(75) Inventor: Erik Thomsen, Cambridge, MA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 772 days.

(21) Appl. No.: 11/081,121

(22) Filed: Mar. 15, 2005

(65) Prior Publication Data

US 2009/0138428 A1 May 28, 2009

(51) Int. Cl.
*G06F 7/00* (2006.01)
(52) U.S. Cl. .................................................. 707/737
(58) Field of Classification Search ................ 707/101, 707/803
See application file for complete search history.

(56) References Cited

U.S. PATENT DOCUMENTS

| | | | |
|---|---|---|---|
| 5,633,728 A | 5/1997 | Tachihara et al. | |
| 5,721,847 A | 2/1998 | Johnson | |
| 5,970,482 A | 10/1999 | Pham et al. | |
| 6,122,628 A * | 9/2000 | Castelli et al. | 707/5 |
| 6,262,736 B1 | 7/2001 | Nelson | |
| 6,366,922 B1 | 4/2002 | Althoff | |
| 6,460,026 B1 | 10/2002 | Pasumansky | |
| 6,490,593 B2 | 12/2002 | Proctor | |
| 6,581,068 B1 | 6/2003 | Bensoussan et al. | |
| 6,651,055 B1 | 11/2003 | Kilmer et al. | |
| 6,750,864 B1 | 6/2004 | Anwar | |
| 6,801,908 B1 | 10/2004 | Fuloria et al. | |
| 6,998,241 B2 | 1/2006 | Guttman et al. | |
| 7,194,134 B2 | 3/2007 | Bradshaw | |
| 7,366,253 B2 | 4/2008 | Kim et al. | |
| 2002/0122596 A1 | 9/2002 | Bradshaw | |
| 2002/0129055 A1 | 9/2002 | Agrawal et al. | |
| 2002/0194095 A1 | 12/2002 | Koren | |
| 2003/0115211 A1 | 6/2003 | Chen et al. | |
| 2003/0144868 A1 | 7/2003 | Macintyre et al. | |
| 2003/0171876 A1 | 9/2003 | Markowitz et al. | |
| 2003/0195897 A1 * | 10/2003 | Agrafiotis et al. | 707/101 |
| 2004/0039736 A1 | 2/2004 | Kilmer et al. | |
| 2005/0065940 A1 | 3/2005 | Akalash et al. | |
| 2005/0123138 A1 | 6/2005 | Abe et al. | |
| 2006/0056546 A1 | 3/2006 | Hayase et al. | |
| 2006/0061589 A1 | 3/2006 | Suyama et al. | |
| 2006/0085444 A1 | 4/2006 | Sarawhi et al. | |
| 2006/0149778 A1 | 7/2006 | Clover | |
| 2006/0206512 A1 | 9/2006 | Hanrahan et al. | |

OTHER PUBLICATIONS

Baja et al.; "Interactive High-Dimensional Data Visualization"; 1996, *Journal of Computational and Graphical Statistics*, pp. 1-19.
Maniatis et al.; "Advanced Visualization for OLAP"; 2003, *Proceedings of the 6th ACM International workshop on Data warehousing and OLAP DOLAP*, pp. 9-16.

(Continued)

*Primary Examiner*—Charles Rones
*Assistant Examiner*—Fazlul Quader
(74) *Attorney, Agent, or Firm*—Townsend and Townsend and Crew LLP

(57) ABSTRACT

A solution is provided wherein the apparent dimensionality of a data set is reduced by ranking combinations of dimensions and parts of dimensions in terms of their suitability for mapping to the axes of a grid display. A user may then be presented with dense lower dimensional views of the data that are much easier to understand than sparse high dimensional views. The user may then make further refinements, groupings, and analyses as needed.

36 Claims, 22 Drawing Sheets

OTHER PUBLICATIONS

Thomsen, Erik; "OLAP Solutions"; 2002, Wiley Computer Publishing, 2nd Edition.

Zaiane et al.; "On-Line Analytical Processing while Immersed in a Cava; User Interfaces to Data Intensive Systems"; 2001, *UIDIS Proceedings, Second International workshop*, pp. 102-115.

"Query, Analysis, and Visualization of Hierarchically Structured Data using Polaris"; 2002 *Proceedings of the Eighth ACM SIGKDD International Conference on Knowledge Discovery and Mining*, pp. 112-122.

U.S. Appl. No. 11/083,060 filed Mar. 16, 2005.

* cited by examiner

|  | Rows in Table | Customer | Product | Manufacturer | Store | Time | Payment |
|---|---|---|---|---|---|---|---|
| Distinct Count | 500 | 250 | 5 | 5 | 5 | 4 | 2 |
| Distinct Count as the nth root of count of rows in table | 1 | 1-2 | 2 | 2-3 | 2-3 | 3 | 6 |

*FIG. 3*

| Product | Store | Manufacturer | Customer |
|---|---|---|---|
| Shoes | Cambridge | Echo | Bill |
| Shoes | Alston | Timberland | Max |
| Shoes | Paris | Ecco | Hannah |
| Shoes | Stamford | Clark | Grace |
| Shoes | Austin | Ecco | Adam |
| Shoes | Stamford | Clark | Deanna |
| Shoes | Austin | Ecco | Al |
| Shoes | Cambridge | Ecco | Melanie |
| Shoes | Paris | Timberland | Marjorie |
| Shoes | Alston | Timberland | Iya |

FIG. 5

| Product.this | Cnt Stores, Prod.this / Cnt Stores, Prod.all | Cnt Cust, Prod.this / Cnt Prod, Prod.all | Cnt Man., Prod.this / Cnt Man., Prod.all |
|---|---|---|---|
| Shoes | 1 | 10/250 | 1 |

FIG. 6

| Product.this | Cnt Stores, Prod.this / Cnt Stores, Prod.all | Cnt Cust, Prod.this / Cnt Prod, Prod.all | Cnt Man., Prod.this / Cnt Man., Prod.all |
|---|---|---|---|
| Shoes | 1 | 10/250 | 1 |
| Socks | 1 | 5/250 | 1 |
| Shirts | 1 | 8/250 | 1 |
| ... | ... | ... | ... |
| Toys | 1 | 4/250 | 1 |
| All | 1 | 0.02 | 1 |

FIG. 7

|  | Time | Product | Store | Customer | Manufacturer | Payment |
|---|---|---|---|---|---|---|
| Time |  | 1 | 1 | 0.04 | 0.8 | 0.8 |
| Product |  |  | 1 | 0.02 | 0.4 | 0.7 |
| Store |  |  |  | 0.1 | 0.3 | 0.9 |
| Customer |  |  |  |  | 0.08 | 0.4 |
| Manufacturer |  |  |  |  |  | 0.7 |
| Payment |  |  |  |  |  |  |

FIG. 8

| Manufacturer | Product |
|---|---|
| Ecco | Shoes |
| Ecco | Shirts |
| Ecco | Shirts |
| Ecco | Pants |
| Ecco | Socks |
| Clark | Slippers |
| Clark | Socks |
| Clark | Socks |
| Timberland | Loafers |
| Timberland | Boots |

*FIG. 10*

| Manufacturer | Product | Rank |
|---|---|---|
| GAP | dress, jeans, shorts, belts | 1 |
| Adidas | shorts, cleats | 3 |
| K2 | skis | 4 |
| Timberland | shoes, shorts | 3 |
| Limited | dress | 4 |
| Reef | shoes | 4 |
| Nike | shorts, cleats | 3 |
| Wrangler | jeans | 4 |
| AE | dress, jeans, belts | 2 |
| Levi's | jeans, belts | 3 |

FIG. 11

| Rank | Product | Manufacturer |
|---|---|---|
|  |  |  |
| 2 | dress | GAP, AE, Limited |
| 1 | jeans | GAP, Wrangler, AE, Levi's |
| 1 | shorts | GAP, Adidas, Timberland |
| 2 | belts | GAP, AE, Levi's |
| 3 | cleats | Adidas, Nike |
| 4 | Skis | K2 |
| 3 | shoes | Timberland, Reef |

FIG. 12

| ID# | Manufacturing Values | Product Values | Area | Shape |
|---|---|---|---|---|
| ID1 | GAP | dress, jeans, shorts, belts | 4 | 4/1 |
| ID2 | GAP, AE | dress, jeans, belts | 6 | 3/2 |
| ID3 | GAP, AE, Adidas | 0 | 0 | NA |
| ID4 | GAP, AE, Timberland | 0 | 0 | NA |
| ID5 | GAP, AE, Nike | 0 | 0 | NA |
| ID6 | GAP, AE, Levi's | jeans, belts | 6 | 2/3 |

FIG. 13

DIMENSIONALITY REDUCTION

FIELD OF THE INVENTION

The present invention relates to the field of computer databases. More specifically, the present invention relates to the reduction of dimensionality in multidimensional databases.

BACKGROUND OF THE INVENTION

Database applications are commonly used to store large amounts of data. One branch of database applications that is growing in popularity is Online Analytical Processing (OLAP) applications. OLAP involves the use of computers to extract useful trends and correlations from large databases of raw data. It may involve consolidating and summarizing huge databases containing millions of items (e.g., sales figures from all branches of a supermarket chain) and making this data viewable along multidimensional axes, while allowing the variables of interest to be changed at will in an interactive fashion. As such, the processing and memory load on OLAP servers is very high.

Typically, a multidimensional database stores and organizes data in a way that better reflects how a user would want to view the data than is possible in a two-dimensional spreadsheet or relational database file. Multidimensional databases are generally better suited to handle applications with large volumes of numeric data and that require calculations on numeric data, such as business analysis and forecasting, although they are not limited to such applications.

A dimension within multidimensional data is typically a basic categorical definition of data. Other dimensions in the database allow a user to analyze a large volume of data from many different perspectives. Each dimension may have a hierarchy associated with it. For example, a product group dimension may have a sublevel in the hierarchy that includes entries such as drinks and cookies. The drinks entry may then have its own sublevel of individual product identifiers for each type of drink sold. Each hierarchy may have any number of levels.

For each event, measures may be recorded. In a sales example, this may include sales amount, product identifier, location of purchase, etc. This raw information is known as input level data. This data may be stored in a multidimensional cube. This cube may be extremely large given the number of dimensions and variables typical to businesses, but it may also be extremely sparse, in that there are large gaps where no information is stored. This is because only a small percentage of the possible combinations of variables will actually be used (e.g., no customer is going to purchase every single item in stock over their lifetime, let alone in a single day).

It is becoming increasingly common to have databases with a large number of dimensions, anywhere from 10 to 35 or more dimensions. Unfortunately, when dealing with that many dimensions, it is difficult for a user to visualize or understand relationships or patterns within the data. Most users cannot visualize anything more than a few dimensions. Additionally, sparsity only adds to this problem, as when the data is sparse, most views, especially at the more granular levels, reveal cells that are mainly empty.

There are several ways to reduce the apparent dimensionality of the data in order to facilitate users' needs to understand and analyze the data, depending upon how much is known. If the variables/data/measures of interest to the user are known (and are numeric), it is possible to rank the dimensions in terms of their correlation with changes to the values of those variables. It is then further possible to select only those dimensions of high rank as candidates for display along the axis of a grid interface. This, therefore, presents to the user only the dimensions that are the most likely to aid in their analysis.

However, there are many times when variables are not numeric, or when specific variables of interest are not known. What is needed is a solution that can reduce the apparent dimensionality of the data set, and thus facilitate its comprehension to users, even when variables of interest are not numeric or are unknown.

BRIEF DESCRIPTION

A solution is provided wherein the apparent dimensionality of a data set is reduced by ranking combinations of dimensions and parts of dimensions in terms of their suitability for mapping to the axes of a grid display. A user may then be presented with dense lower dimensional views of the data that are much easier to understand than sparse high dimensional views. The user may then make further refinements, groupings, and analyses as needed.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 3 is a diagram illustrating an example of table statistics for finding columns of medium distinct count in accordance with an embodiment of the present invention.

FIG. 5 is a diagram illustrating an example of retrieved rows from a source table in accordance with an embodiment of the present invention.

FIG. 6 is a diagram illustrating an example of the recording of the orthogonality index per a single value of one column.

FIG. 7 is a diagram illustrating an example of the recording of the orthogonality index for all values of a Product dimension including an aggregate value in accordance with an embodiment of the present invention.

FIG. 8 is a diagram illustrating an example of a structure of aggregate orthogonality indices in accordance with an embodiment of the present invention.

FIG. 10 is a diagram illustrating an example of the concatenation of all select statements constrained by manufacturer name in accordance with an embodiment of the present invention.

FIG. 11 is a diagram illustrating an example of a nested array in accordance with an embodiment of the present invention.

FIG. 12 is a diagram illustrating an example of a sister nested array in accordance with an embodiment of the present invention.

FIG. 13 is a diagram illustrating an example of a table identifying local regions of orthogonality in accordance with an embodiment of the present invention.

DETAILED DESCRIPTION

Figure 1:
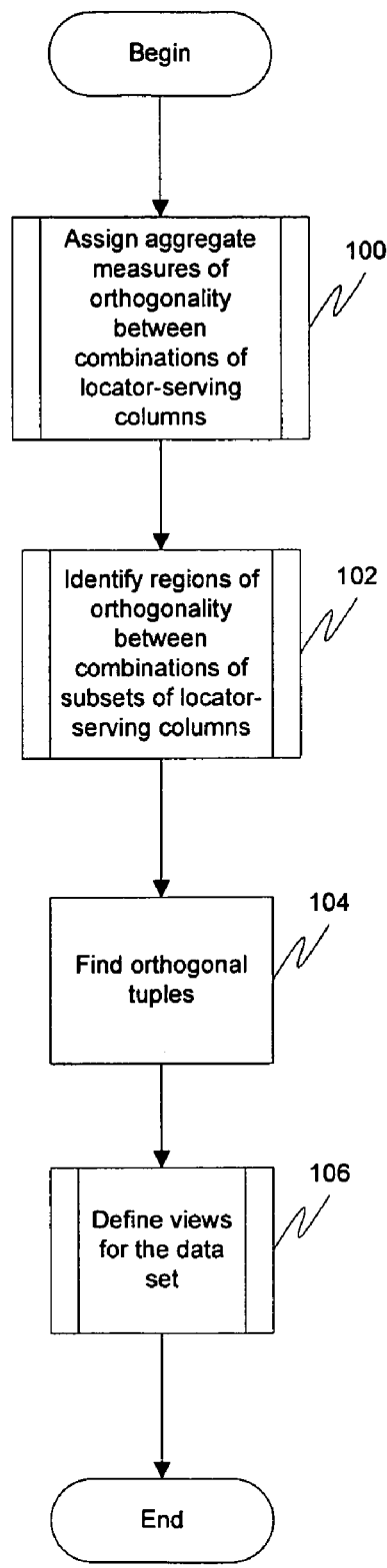
FIG. 1 is a flow diagram illustrating a method for selecting a view of a data set in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution is provided wherein the apparent dimensionality of a data set is reduced by ranking combinations of dimensions and parts of dimensions in terms of their suitability for mapping to the axes of a grid display. A user may then be presented with dense lower dimensional views of the data that are much easier to understand than sparse high dimensional views. The user may then make further refinements, groupings, and analyses as needed.

It should be noted that while the solution presented has specific applicability to cases where variables of interest are either non-numeric or are unknown, the solution may easily be extended to situations where more is known about the users' intents or the data is numeric.

A problem that is encountered in this solution is that there are a number of decisions that need to be made when the source data is assumed to be in third normal form and that the collection of columns which comprise the candidate key are significantly interdependent such that most dimensional combinations are sparse. Third normal form (3NF) is one of a series of guidelines the database community has developed to ensure that databases are normalized. Normalization is the process of efficiently organizing data in a database. There are two goals of this process: eliminating redundant data and ensuring data dependencies make sense. First normal form (1NF) sets the very basic rules for an organized database, including eliminating duplicative columns from the same table and creating separate tables for each group of related data and identifying each row with a unique column or set of columns (the primary key). Second normal form (2NF) further addresses the concept of removing duplicative data by removing subsets of data that apply to multiple rows of a table and placing them in separate tables, as well as creating relationships between these new tables and their predecessors through the user of foreign keys. Third normal form (3NF) then removes columns that are not dependent upon the primary key. These guidelines are cumulative.

The decisions that must be made based upon this source data in third normal form are:

1. Which columns are sufficiently orthogonal relative to each other and relative to the data that they can be freely displayed with dense data on either a row or column of a grid interface.

2. Which columns are sufficiently orthogonal relative to each other and for a subset of their respective values that they can be freely displayed with dense data on either a row or a column within that value range.

3. Which columns can be treated as measures to be displayed as cells and how to resolve multi-valued dependencies with respect to grid intersections.

4. Which columns should be kept as a point of view or pages and how to treat the fact that multiple values of a point of view dimension connect to single cells in the grid.

5. When point of view columns are brought into rows or columns of the grid, how to do so in a way that avoids the display of sparse intersections.

The only information that may be assumed to be available about the data source is basic data type information, numeric versus string at a minimum. Additionally, for decision #3, regarding multi-valued dependencies amongst the measures, it is helpful but not necessary to be able to assign an aggregation rule to the measure.

The basic approach to solving this problem is to treat column categories as roles. Specifically, each role may be thought of as a named variable defined in terms of a region/cluster of values in a statistical space whose values may be calculated by the processes outlined in this document.

It may be helpful now to provide some general definitions. As to dimensionality reduction, the term dimensionality reduction has been used in the past in conjunction with attempts to facilitate the modeling and analysis of high dimensional data sets. However, the classic techniques for dimensionality reduction, such as principal components analysis and multidimensional scaling, are not relevant to the problem at hand because these techniques assume that the dimensions are numeric and that it is satisfactory to create derived dimensions that are a function of, and replace, several source dimensions.

These assumptions are justified in classic sensory recognition problems, such as facial recognition, where many of the mathematical techniques are commonly used. However, for the problem at hand, it is typically necessary to work with categorical dimensions whose distinct identifiers need to be maintained.

When two columns in a table are fully independent of each other and when their distinct tuples form a candidate key for the table as a whole they are said to form a fully orthogonal complete basis for the table. This document proposes some specific techniques for finding whole columns and parts of columns (specific value ranges) that can serve as an orthogonal basis for some derived view of the table. Since there is no commonly-used term to describe this situation, the following terms are provided.

Two columns can be said to be fully orthogonal partial bases if they are fully orthogonal relative to each other but do not form a basis for the table as a whole. For example, if a candidate key for a table includes "Stores", "Times" and "Products" and if every "Store" is paired with every "Time", then "Store" and "Time" are fully orthogonal relative to each other, but combined they do not form a basis or candidate key for the table as a whole. As a short hand, these may be referred to as globally semi-orthogonal.

Two columns can be said to be semi-orthogonal partial basis if they are not fully orthogonal relative to each other but there does exist a fully orthogonal relationship between some subset of the values in each of the two columns. For example, if "Stores" and "Products" are not fully orthogonal but for some set of "Stores", every element in a subset of the "Products" is paired, then for that subset of "Stores" and "Products", a local orthogonal relationship exists and the two columns may be said to be locally semi-orthogonal.

The term "dense" could, in some instances, be used as a synonym for orthogonal and "sparse" for non-orthogonal. However, there are times when it becomes necessary to distinguish between dense and orthogonal (as well as sparse and non-orthogonal), such as when there are substantial differences in data distribution within a table. Therefore, for purposes of claim interpretation, dense should not be interpreted as a synonym for orthogonal, nor sparse as a synonym for non-orthogonal.

FIG. 1 is a flow diagram illustrating a method for selecting a view of a data set in accordance with an embodiment of the present invention. At 100, aggregate measures of orthogonality may be assigned to the relationships between combinations of locator-serving columns. At 102, regions of orthogonality between combinations of subsets of locator-serving columns may be identified. At 104, orthogonal tuples may be found. At 106, views for the data set may be defined.

It should be noted that in practice, it is possible that the locator relationships can be ferreted out using only a sample of the source table, especially when the source table is large. This is due to the fact that tuple uniqueness and orthogonality are properties that apply locally as well as globally. While it is possible to be sure that what appears as a locator locally is a locator globally, what does not appear as a locator locally cannot be a locator globally. In this sense, looking for locators is akin to efficient elimination of candidates. Therefore, to the extent that the processes defined in this document appear to require a full table scan, such as constrained select distincts on non-indexed columns, such processes should not be limited to such and one of ordinary skill in the art will recognize that it is possible to restrict it to the first "X" rows of the table.

Figure 2:
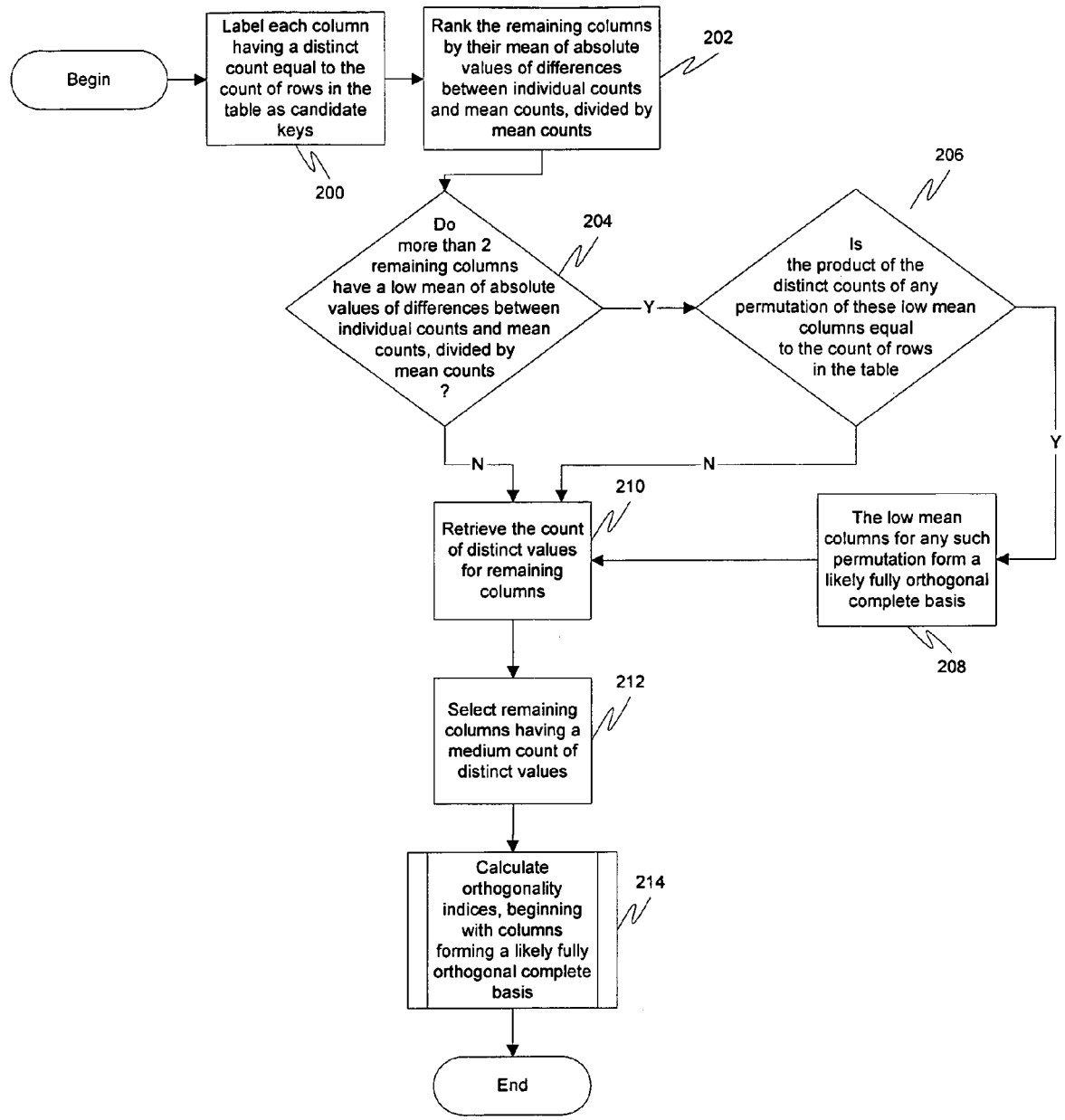
FIG. 2 is a flow diagram illustrating a method for assigning aggregate measures of orthogonality to the relationships between combinations of locator-serving columns in accordance with an embodiment of the present invention.

FIG. 2 is a flow diagram illustrating a method for assigning aggregate measures of orthogonality to the relationships between combinations of locator-serving columns in accordance with an embodiment of the present invention. FIG. 2 illustrates 100 of FIG. 1 in more detail. First, it may be determined if the table can be described in terms of a small number of fully orthogonal bases. Therefore, at 200 it may be determined if any columns have a distinct count equal to the count of rows in the table. If so, each of these columns may be considered candidate location structures (keys). At 202, the remaining columns may be ranked by their means of absolute values of differences between individual counts and mean counts, divided by mean count. In other words, the frequency that each distinct value appears in the column is measured. The mean of these frequencies is then the mean of individual count for the column. At 204, it may be determined if more than two remaining columns have a low mean of absolute values of differences between individual counts and mean counts, divided by mean count. In an embodiment of the present invention, low may be defined as having a mean of absolute values of differences between individual counts and mean counts, divided by mean count, of less than 10%. If this is the case, then at 206 it may be determined if the products of any permutation of these low mean remaining columns are equal to the count of rows in the table. There will be $2^n-n-1$ permutations, where n is the number of low-mean non-key columns. Therefore, if there are only two low-mean remaining columns, then there is only one permutation to test. If there are three low-mean remaining columns, then there will be 4 permutations to test. If there are four low-mean remaining columns, then there will be 11 permutations to test, and so on. As a practical matter, one would generally see only one of these permutations yielding a match as to the product of the distinct counts of the corresponding columns being equal to the count of rows in the table, however, it is possible that there will be more than one matching permutation, and therefore the present invention should be read broad enough to cover such cases. If such a permutation exists, then at 208 the low mean columns for any such permutation form a likely fully orthogonal complete basis.

Now it may be determined if there are any global semi-orthogonal locators. At 210, the count of distinct values for any remaining columns may be retrieved. It should be noted that here, the term "remaining" refers to any columns that have not been labeled as candidate keys or form part of a likely fully orthogonal complete basis. At 212, remaining columns having a medium count of distinct values may be selected. In one embodiment of the present invention, a medium count of distinct values may be considered to be equal to the square root to the fourth root of the count of rows in the table. However, one of ordinary skill in the art will recognize that this range may vary based upon implementation. FIG. 3 is a diagram illustrating an example of table statistics for finding columns of medium distinct count in accordance with an embodiment of the present invention. The shaded area 300 represents columns having medium distinct count. Referring back to FIG. 2, at 214, orthogonality indices may be calculated, beginning with columns forming a likely fully orthogonal complete basis.

Figure 4:
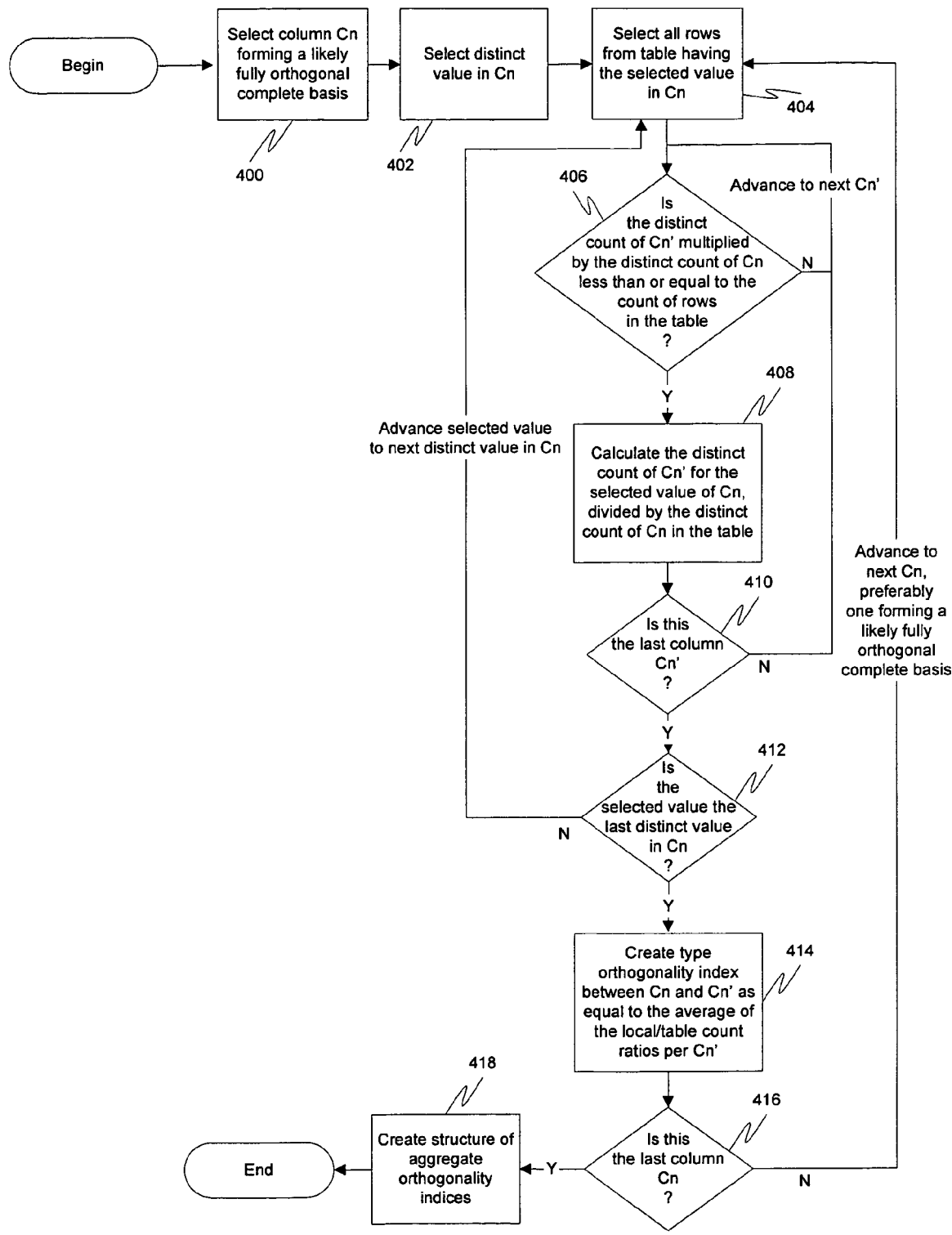
FIG. 4 is a flow diagram illustrating a method for calculating orthogonality indices in accordance with an embodiment of the present invention.

FIG. 4 is a flow diagram illustrating a method for calculating orthogonality indices in accordance with an embodiment of the present invention. FIG. 4 illustrates 214 of FIG. 2 in more detail. $C_n$ is a column having a medium count of distinct values. One of ordinary skill in the art will recognize that the process may start with a $C_n$ being any of the columns having a medium count of distinct values, as the process will eventually iterate through all such columns. However, in an embodiment of the present invention, the column $C_n$ with the middlemost distinct count will be chosen first in order to improve efficiency. Additionally a distinct value may be selected in $C_n$, which will be called the selected value, and likewise the process will eventually iterate through all such selected values, so it may start with an any of the distinct values in $C_n$. At 400, a column $C_n$ forming a likely fully orthogonal complete basis may be selected. Then, at 402, a distinct value in $C_n$ may be selected. At 404, all rows from the table that contain the selected value in $C_n$ may be selected. FIG. 5 is a diagram illustrating an example of retrieved rows from a source table in accordance with an embodiment of the present invention, here based on the value "Shoes" for the column "Product".

$C_n'$ is a column, different from $C_n$, having a medium count of distinct values. As the process will cycle through all columns $C_n'$ for a given $C_n$, the process may start with any column $C_n'$. Referring back to FIG. 4, at 406, it may be determined if the distinct count of $C_n$ multiplied by the distinct count of $C_n'$ is less than or equal to the count of rows in the table. If not, then there is no chance that column $C_n'$ is orthogonal to column $C_n$, and the process may then advance to the next $C_n'$; and loop back to 406. However, when this product is less than or equal to the count of rows in the table, then at 408, the distinct count of $C_n'$ for the selected value of $C_n$ (i.e., from the selected rows) divided by the distinct count of $C_n'$, in the table may be calculated. This ratio is known as its orthogonality index. FIG. 6 is a diagram illustrating an example of the recording of the orthogonality index per a single value of one column. Referring back to FIG. 4, at 410, it may be determined if this is the last column $C_n'$ for this column $C_n$. If not, then the process may loop back up to 406, advancing to the next $C_n'$. If so, however, then at 412 it may be determined if the selected value is the last distinct value in $C_n$. If not, then the process may loop back up to 404, advancing the selected value to the next distinct value in $C_n$. If so, however, then at 414 a type orthogonality index can be created between $C_n$ and $C_n'$ as equal to the average of the local/table count ratios per $C_n'$. FIG. 7 is a diagram illustrating an example of the recording of the orthogonality index for all values of a Product dimension including an aggregate value in accordance with an embodiment of the present invention. Referring back to FIG. 4, at 416, it may be determined if this is the last column $C_n$. If not, then the process may loop back up to 404, advancing to the next $C_n$, preferably one forming a likely fully orthogonal complete basis. If so, however, then at 418, a structure of aggregate orthogonality indices may be created. FIG. 8 is a diagram illustrating an example of a structure of aggregate orthogonality indices in accordance with an embodiment of the present invention.

Figure 9:
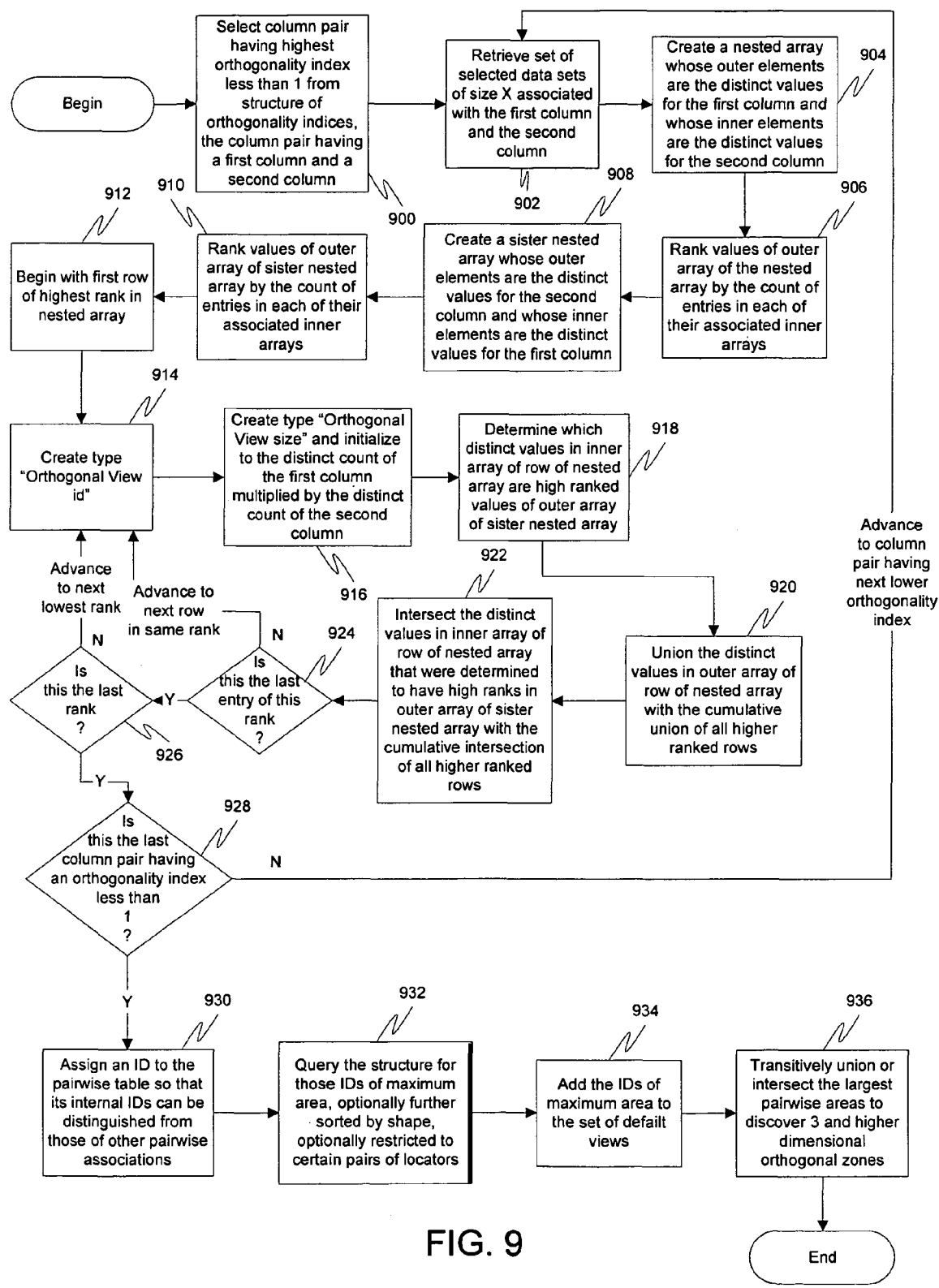
FIG. 9 is a flow diagram illustrating a method for identifying regions of orthogonality between combinations of subsets of locator-serving columns in accordance with an embodiment of the present invention.

FIG. 9 is a flow diagram illustrating a method for identifying regions of orthogonality between combinations of subsets of locator-serving columns in accordance with an embodiment of the present invention. At 900, the column pair having the highest orthogonality index less than 1 may be selected from the structure of orthogonality indices, the column pair having a first column and a second column. At 902, a set of selected data sets of size X associated with the first column and the second column may be retrieved. FIG. 10 is a diagram illustrating an example of the concatenation of all select statements constrained by manufacturer name in accordance with an embodiment of the present invention. Referring back to FIG. 9, at 904, a nested array may be created whose outer elements are the distinct values for the first column and whose inner elements are the distinct values for the second column. At 906, the values of the outer array may be ranked by the count of entries in each of their associated inner arrays. FIG. 11 is a diagram illustrating an example of a nested array in accordance with an embodiment of the present invention. Referring back to FIG. 9, at 908, a sister nested array may be created whose outer elements are the distinct values for the second column and whose inner elements are the distinct values for the first column. At 910, the values of the outer array of the sister nested array may be ranked by the count of entries in each of their associated inner arrays. FIG. 12 is a diagram illustrating an example of a sister nested array in accordance with an embodiment of the present invention.

Referring back to FIG. 9, at 912, a loop may begin with the first row of the highest rank in the nested array. At 914, a type "Orthogonal View id" may be created. At 916, a type "Orthogonal View size" may be created and initialized to the distinct count of the first column multiplied by the distinct count of the second column. At 918, it may be determined which distinct values in the inner array of the row of nested array are high ranked values of the outer array of the sister nested array. At 920, the distinct values in the outer array of the row of the nested array may be unioned with the cumulative union of all higher ranked rows. At 922, the distinct values in the inner array of the row of the nested array that were determined to have high ranks in the outer array of the sister nested array may be intersected with the cumulative intersection of all higher ranked rows. The intersection information may be added to a table identifying local regions of orthogonality. At 924, it may be determined if this is the last entry of this rank. If not, then the process may loop back to 914, advancing to the next row in the same rank. If so, however, then at 926 it may be determined if this is the last rank. If not, then the process may loop back to 914, advancing to the next lowest rank.

At 928, it may be determined if this is the last column pair having an orthogonality index less than one. If not, then the process may loop back to 902, advancing to the column pair having the next lower orthogonality index. If so, however, then at 930, an ID may be assigned to the pairwise table so that its internal IDs can be distinguished from those of other pairwise associations. At 932, the structure may be queried for those IDs of maximum area, optionally further sorted by shape, optionally restricted to certain pairs of locators. FIG. 12 is a diagram illustrating an example of a pairwise table showing local region of orthogonality in accordance with an embodiment of the present invention. At 934, the IDs of maximum area may be added to the set of default views. At 936, the largest pairwise areas may be transitively unioned or intersected to discover 3 and higher dimensional orthogonal zones. At this point, a table identifying local regions of orthogonality has been generated. FIG. 13 is a diagram illustrating an example of a table identifying local regions of orthogonality in accordance with an embodiment of the present invention.

Following this, the process may move to finding orthogonal tuples. This would be a refinement of the process depicted in FIG. 9. The goal here would be to find groupings of seemingly unrelated tuples that just so happen to have values for all their combinations of columns. By doing so, one would uncover an additional region of orthogonality. It should be noted, however, that in many cases, such a region would not be helpful in determining which views to select, as the user would normally be interested in groupings of related, not unrelated, data. However, there are some instances where the locating of orthogonal tuples would be helpful in determining the view to select, and therefore this step can, in certain instances, be extremely helpful.

Figure 14:
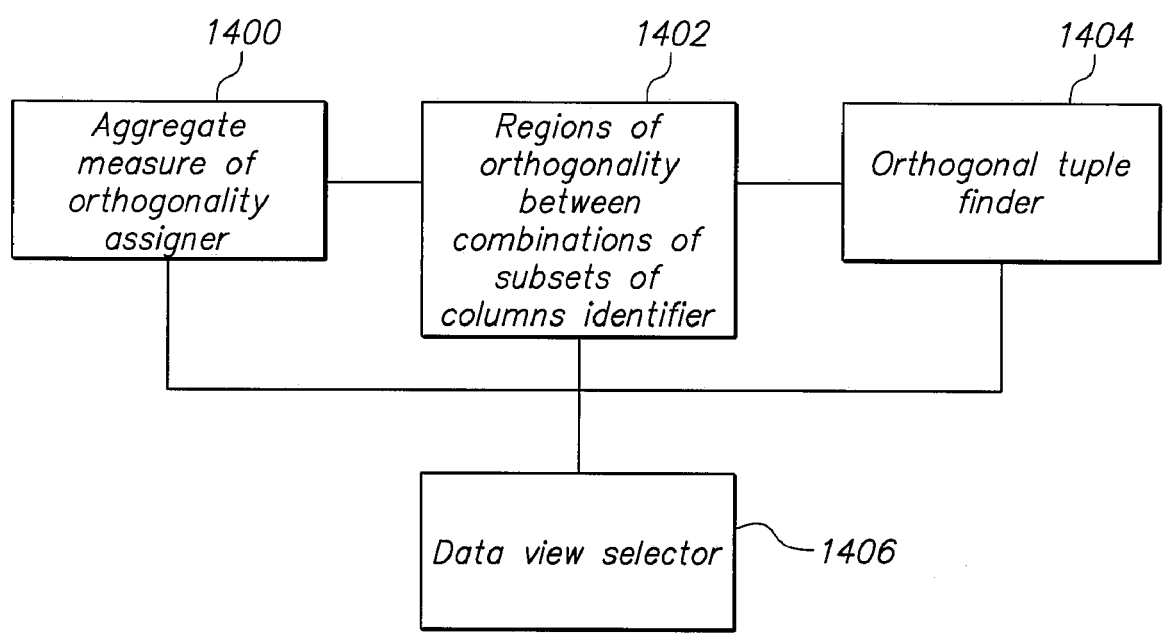
FIG. 14 is a block diagram illustrating an apparatus for selecting a view of a data set in accordance with an embodiment of the present invention.

FIG. 14 is a block diagram illustrating an apparatus for selecting a view of a data set in accordance with an embodiment of the present invention. An aggregate measure of orthogonality assigner 1400 may assign aggregate measures of orthogonality to the relationships between combinations of locator-serving columns. A regions of orthogonality between combinations of subsets of columns identifier 1402 may identify regions of orthogonality between combinations of subsets of locator-serving columns may be identified. An orthogonal tuple finder 1404 may then find orthogonal tuples. Finally, a data view selector 1406 coupled to the aggregate measure of orthogonality assigner 1400, the regions of orthogonality between combinations of subsets of columns identifier 1402, and the orthogonal tuple finder 1404 may define views for the data set.

It should be noted that in practice, it is possible that the locator relationships can be ferreted out using only a sample of the source table, especially when the source table is large. This is due to the fact that tuple uniqueness and orthogonality are properties that apply locally as well as globally. While it is possible to be sure that what appears as a locator locally is a locator globally, what does not appear as a locator locally cannot be a locator globally. In this sense, looking for locators is akin to efficient elimination of candidates. Therefore, to the extent that the processes defined in this document appear to require a full table scan, such as constrained select distincts on non-indexed columns, such processes should not be limited to such and one of ordinary skill in the art will recognize that it is possible to restrict it to the first "X" rows of the table.

Figure 15:
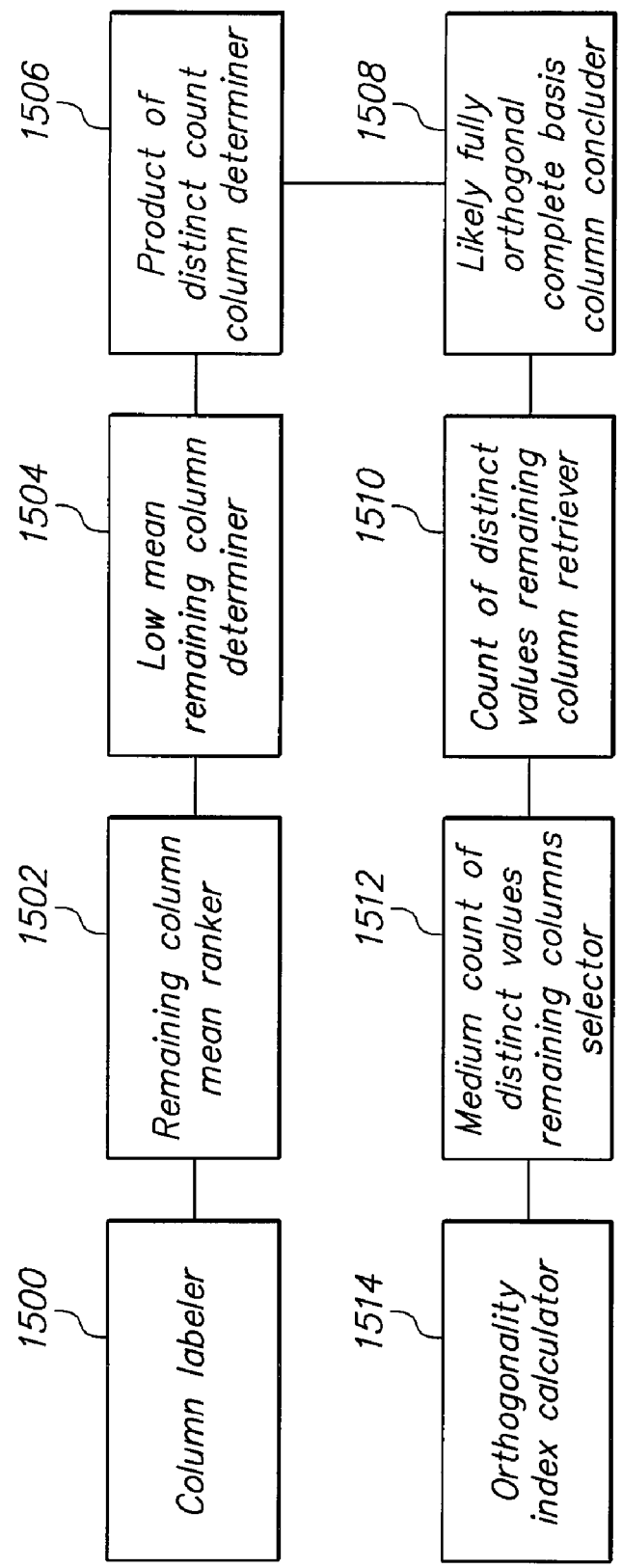
FIG. 15 is a block diagram illustrating an aggregate measure of orthogonality assigner 1400 in more detail in accordance with an embodiment of the present invention.

FIG. 15 is a block diagram illustrating an aggregate measure of orthogonality assigner 1400 in more detail in accordance with an embodiment of the present invention. First, it may be determined if the table can be described in terms of a small number of fully orthogonal bases. Therefore, a candidate key column labeler 1500 may determine if any columns have a distinct count equal to the count of rows in the table. If so, each of these columns may be considered candidate location structures (keys). A remaining column mean ranker 1502 coupled to the candidate key column labeler 1500 may then rank the remaining columns by their mean of absolute values of differences between individual counts and mean counts, divided by mean count. A low mean remaining column determiner 1504 coupled to the remaining column mean ranker 1502 may determine if more than two remaining columns have a low mean of absolute values of differences between individual counts and mean counts, divided by mean count. In an embodiment of the present invention, low may be defined as having a mean of absolute values of differences between individual counts and mean counts, divided by mean count, of less than 10%. If that is the case, then a product of distinct count column determiner 1506 coupled to the low mean remaining column determiner 1504 may determine if the products of any permutation of these low-mean remaining columns are equal to the count of rows in the table. There will be $2^n$-n-1 permutations, where n is the number of low-mean non-key columns. Therefore, if there are only two low-mean remaining columns, then there is only one permutation to test. If there are three low-mean remaining columns, then there will be 4 permutations to test. If there are four low-mean remaining columns, then there will be 11 permutations to test, and so on. As a practical matter, one would generally see only one of these permutations yielding a match as to the product of the distinct counts of the corresponding columns being equal to the count of rows in the table, however, it is possible that there will be more than one matching permutation, and therefore the present invention should be read broad enough to cover such cases. If such a permutation exists, then a likely fully orthogonal complete basis column concluder 1508 coupled to the product of distinct count column determiner 1506 may conclude that the low mean columns for any such permutation form a likely fully orthogonal complete basis.

Now it may be determined if there are any global semi-orthogonal locators. A count of distinct values remaining column retriever 1510 coupled to the likely fully orthogonal complete basis column concluder 1508 may retrieve the count of distinct values for any remaining columns. It should be noted that here, the term "remaining" refers to any columns that have not been labeled as candidate keys or form part of a likely fully orthogonal complete basis. A medium count of distinct values remaining columns selector 1512 coupled to the count of distinct values remaining column retriever 1510 may select remaining columns having a medium count of distinct values. In one embodiment of the present invention, a medium count of distinct values may be considered to be equal to the square root to the fourth root of the count of rows in the table. However, one of ordinary skill in the art will recognize that this range may vary based upon implementation. Then, an orthogonality index calculator 1514 coupled to the medium count of distinct values remaining columns selector 1512 may calculate orthogonality indices, beginning with columns forming a likely fully orthogonal complete basis.

Figure 16:
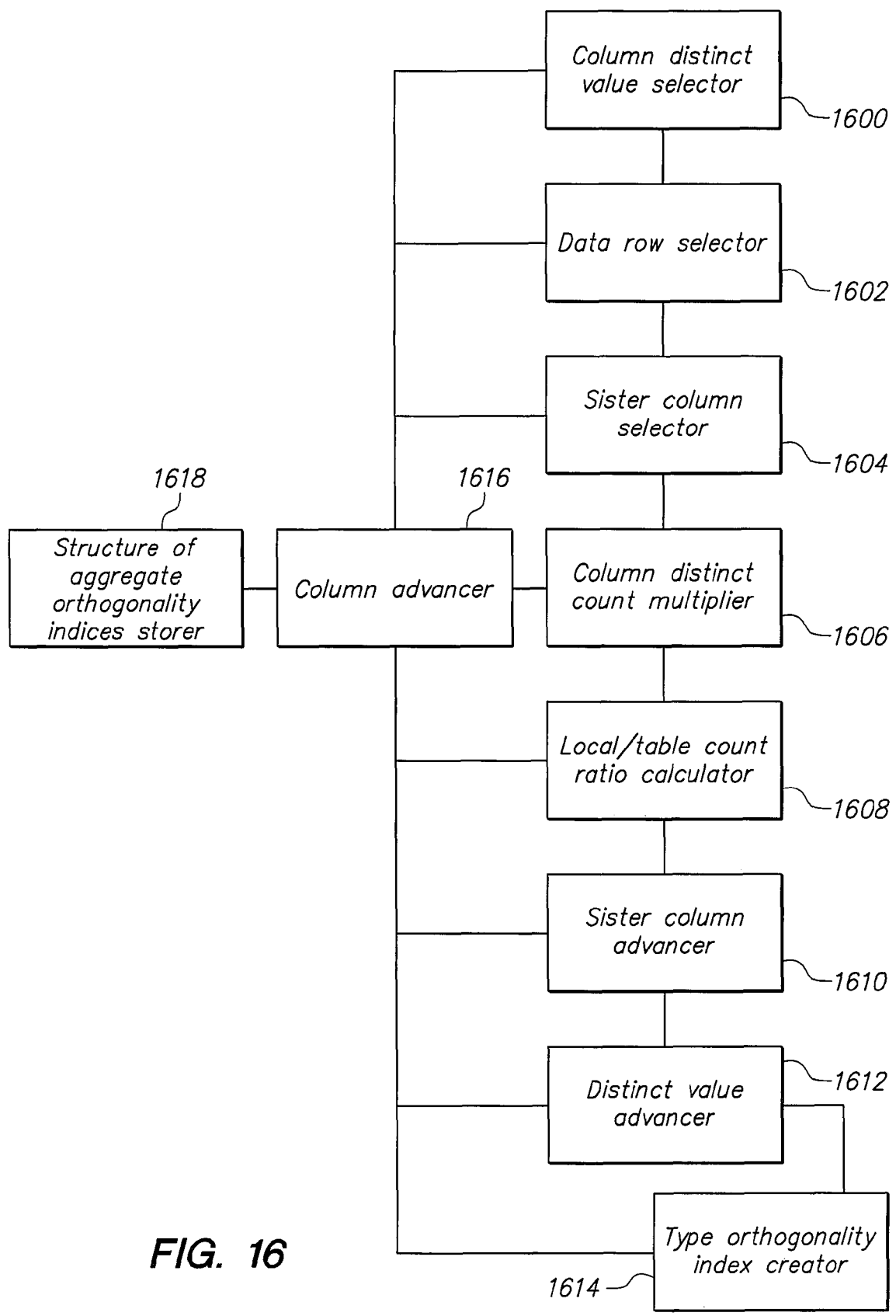
FIG. 16 is a block diagram illustrating an orthogonality index calculator in more detail in accordance with an embodiment of the present invention.

FIG. 16 is a block diagram illustrating an orthogonality index calculator 1514 in more detail in accordance with an embodiment of the present invention. $C_n$ is a column having a medium count of distinct values. One of ordinary skill in the art will recognize that the process may start with a $C_n$ being any of the columns having a medium count of distinct values, as the process will eventually iterate through all such columns. However, in an embodiment of the present invention, the column $C_n$ with the middlemost distinct count will be chosen first in order to improve efficiency. Additionally a distinct value may be selected in $C_n$, which will be called the selected value, and likewise the process will eventually iterate through all such selected values, so it may start with an any of the distinct values in $C_n$. First, a column $C_n$ forming a likely fully orthogonal complete basis may be selected. Then, a column distinct value selector 1600 may select a distinct value in $C_n$. A data row selector 1602 coupled to the column distinct value selector 1600 may select all rows from the table that contain the selected value in $C_n$.

$C_n'$ is a column, different from $C_n$, having a medium count of distinct values. As the process will cycle through all columns $C_n'$ for a given $C_n$, the process may start with any column $C_n'$ using a sister column selector 1604 coupled to the data row selector 1602. A sister column distinct count by column distinct count multiplier 1606 coupled to the sister column selector 1604 may determine if the distinct count of $C_n$ multiplied by the distinct count of $C_n'$ is less than or equal to the count of rows in the table. If not, then there is no chance that column $C_n'$ is orthogonal to column $C_n$ and the process may then advance to the next $C_n$ and loop back to the processes executed by the sister column selector 1604. If, however, this product is less than or equal to the count of rows in the table, then a local/table count ratio calculator 1608 coupled to the sister column distinct count by column distinct count multiplier 1606 may calculate the distinct count $C_n$ multiplied by the distinct count of $C_n'$ for the selected value of $C_n$ (i.e., from the selected rows) divided by the distinct count of $C_n$ in the table. This ratio is known as its orthogonality index. A sister column advancer 1610 coupled to the sister column distinct count by column distinct count multiplier 1606 and to the local/table count ratio calculator 1608 may determine if this is the last column $C_n'$ for this column $C_n$. If not, then the process may loop back up to the processes executed by the sister column selector 1604, advancing to the next $C_n'$. If so, however, then a distinct value advancer 1612 coupled to the data row selector 1602, the sister column selector 1604, the sister column distinct count by column distinct count multiplier 1606, the local/table count ratio calculator 1608, and the sister column advancer 1610 may determine if the selected value is the last distinct value in $C_n$. If not, then the process may loop back up to processes executed by the data row selector 1602, advancing the selected value to the next distinct value in $C_n$. If so, however, then a type orthogonality index creator 1614 coupled to the distinct value advancer 1612 may create a type orthogonality index can be created between $C_n$ and $C_n'$ as equal to the average of the local/table count ratios per $C_n'$. A column advancer 1616 coupled to the column distinct value selector 1600, the data row selector 1602, the sister column selector 1604, the sister column distinct count by column distinct count multiplier 1606, the local/table count ratio calculator 1608, the sister column advancer 1610, the distinct value advancer 1612, and the type orthogonality index creator 1614, may determine if this is the last column $C_n$. If not, then the process may loop back up to the processes executed by the column distinct value selector 1600, advancing to the next $C_n$, preferably one forming a likely fully orthogonal complete basis. If so, however, then a structure of aggregate orthogonality indices storer 1618 coupled to the column advancer 1616 may create a structure of aggregate orthogonality indices.

Figure 17:
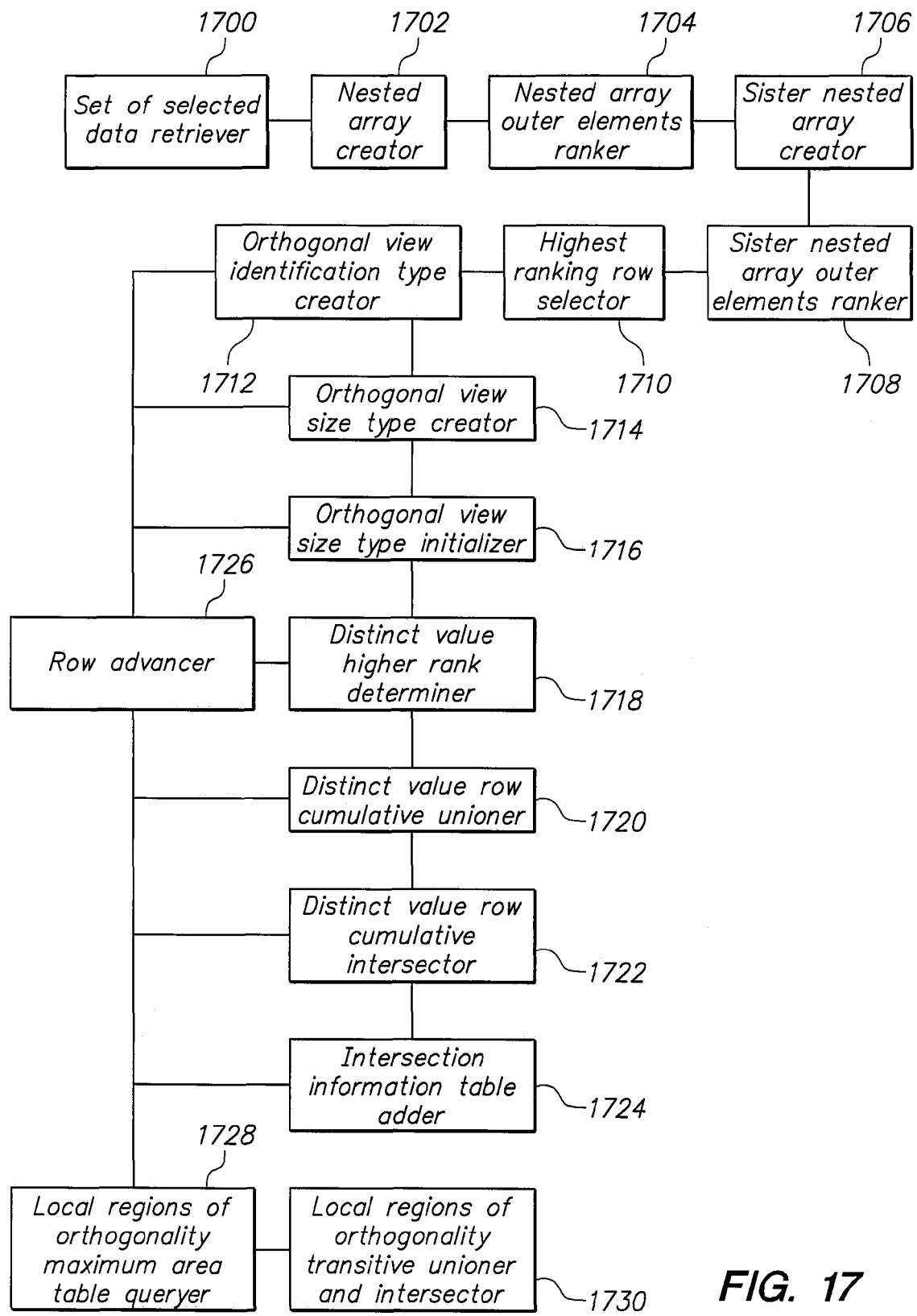
FIG. 17 is a block diagram illustrating a regions of orthogonality between combinations of subsets of columns identifier in more detail in accordance with an embodiment of the present invention.

FIG. 17 is a block diagram illustrating a regions of orthogonality between combinations of subsets of columns identifier 1402 in more detail in accordance with an embodiment of the present invention. The column pair having the highest orthogonality index less than 1 may be selected from the structure of orthogonality indices, the column pair having a first column and a second column. A set of selected data retriever 1700 may then retrieve a set of selected data sets of size X associated with the first column and the second column. A nested array creator 1702 coupled to the set of selected data retriever 1700 may then create a nested array whose outer elements are the distinct values for the first column and whose inner elements are the distinct values for the second column. A nested array outer elements ranker 1704 coupled to the nested array creator 1702 may then rank the values of the outer array by the count of entries in each of their associated inner arrays. A sister nested array creator 1706 coupled to the nested array outer elements ranker 1704 may create a sister nested array whose outer elements are the distinct values for the second column and whose inner elements are the distinct values for the first column. A sister nested array outer elements ranker 1708 coupled to the sister nested array creator 1706 may then rank the values of the outer array of the sister nested array by the count of entries in each of their associated inner arrays.

A loop may begin with the selection of the first row of the highest rank in the nested array using a highest ranking row selector 1710 couple to the sister nested array outer elements ranker 1708. Then, an orthogonal view identification type creator 1712 coupled to the highest ranking row selector 1710 may create a type "Orthogonal View id". An orthogonal view size type creator 1714 coupled to the orthogonal view identification type creator 1712 may then create a type "Orthogonal View size". An orthogonal view size type initializer 1716 coupled to the orthogonal view size type creator 1714 may initialize the "Orthogonal View size" type to the distinct count of the first column multiplied by the distinct count of the second column. A distinct value higher rank determiner 1718 coupled to the orthogonal view size type initializer 1716 may determine which distinct values in the inner array of the row of nested array are high ranked values of the outer array of the sister nested array. A distinct value row cumulative unioner 1720 coupled to the distinct value higher rank determiner 1718 may union the distinct values in the outer array of the row of the nested array with the cumulative union of all higher ranked rows. A distinct value row cumulative intersector 1722 coupled to the distinct value row cumulative unioner 1720 may intersect the distinct values in the inner array of the row of the nested array that were determined to have high ranks in the outer array of the sister nested array with the cumulative intersection of all higher ranked rows. The intersection information may be added to a table identifying local regions of orthogonality using an intersection information table adder 1724 coupled to the distinct value row cumulative intersector 1722. A row advancer 1726 coupled to the orthogonal view size type creator 1714, the orthogonal view size type initializer 1716, the distinct value higher rank determiner 1718, the distinct value row cumulative unioner 1720, the distinct value row cumulative intersector 1722, and the intersection information table adder 1724 may determine if this is the last entry of this rank. If not, then the process may loop back to the processes executed by the orthogonal view identification type creator 1712, advancing to the next row in the same rank, then to the next row in the next lower rank if no rows are left in the rank.

It may then be determined if this is the last column pair having an orthogonality index less than one. If not, then the process may loop back to the processes executed by the set of selected data retriever 1700, advancing to the column pair having the next lower orthogonality index. If so, however, then an ID may be assigned to the pairwise table so that its internal IDs can be distinguished from those of other pairwise associations. A local regions of orthogonality maximum area table queryer 1728 coupled to the row advancer 1726 may then query the structure for those IDs of maximum area, optionally further sorted by shape, optionally restricted to certain pairs of locators. The IDs of maximum area may be added to the set of default views. Finally, a local regions of orthogonality transitive unioner and intersector 1730 coupled to the local regions of orthogonality maximum area table queryer 1728 may transitively union or intersect the largest pairwise areas to discover 3 and higher dimensional orthogonal zones.

These processes outlined above have ferreted out zones of orthogonality such that the columns/dimensions/locators involved could be used to define the rows and columns of a grid interface without creating visual sparsity. In other words, the cells could be filled with content/data/information/measures that are likely the most interesting to the users. The basic premise for this effort is that for many real data sets, the vast majority of the locations are not orthogonal. Yet, customers are accustomed to, and prefer, viewing data through orthogonal grid-based mechanism. The users' ability to understand data is improved when they can view the data relative to an orthogonal basis.

Processes that take into account some specific aspects of what the user is trying to accomplish, such as decisions that need to be made, or relationships that need to be understood, may be added on top of this framework or used to further restrict the set of "equally interesting" views.

In order to display data according to semi-orthogonal locators, some generalization of the standard viewing mechanisms is required. Specifically, they need to support multiple instances of a content to be associated with any cell (location), and for the dimensions placed in a slicing mechanism, to have multiple values associated with any cell, and by extension, the entire grid. Current viewing mechanisms lack this ability.

Figure 18:
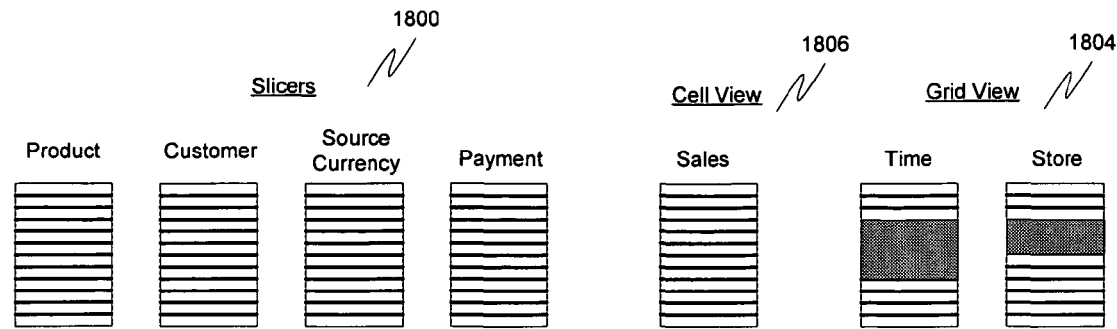
FIG. 18 is a diagram illustrating a standard viewing mechanism for source data.

FIG. 18 is a diagram illustrating a standard viewing mechanism for source data. Slicers (or points of view) 1800 represent values of all dimensions not a part of a selected grid 1802. Grid view 1804 represents values of all dimensions that are a part of the selected grid. Cell view 1806 represents values of the dimension that is going to be displayed in individual cells. While current viewing mechanisms allow users to select a range of values to include in the grid view 1804 and cell view 1806 dimensions, there is no mechanism to allow users to select ranges of values to include in the slicer 1800 dimensions. Thus, the grid 1802 displays, for each cell, an aggregation of the data for the ranges of specified grid view 1804 dimensions, with the aggregation being performed across all values of the slicer dimensions. For example, in FIG. 18, the aggregated value for "May" and "Cambridge" 1808 would be $2100, representing the total aggregated sales for the Cambridge store in May, across all products, all customers, all source currencies, and all payments. These current mechanisms, however, fail to allow for the possibility of a range of values in each slicer to which the user wishes to limit the aggregation. They also fail to allow for the possibility that the particular collection of values can vary from cell to cell. Finally, they only work with values that support aggregation, such as numeric values. There is no way for them to show multiple values in a single cell when the multiple values are of types that do not support simple aggregation, such as customer names or customer attitude labels.

Figure 19:
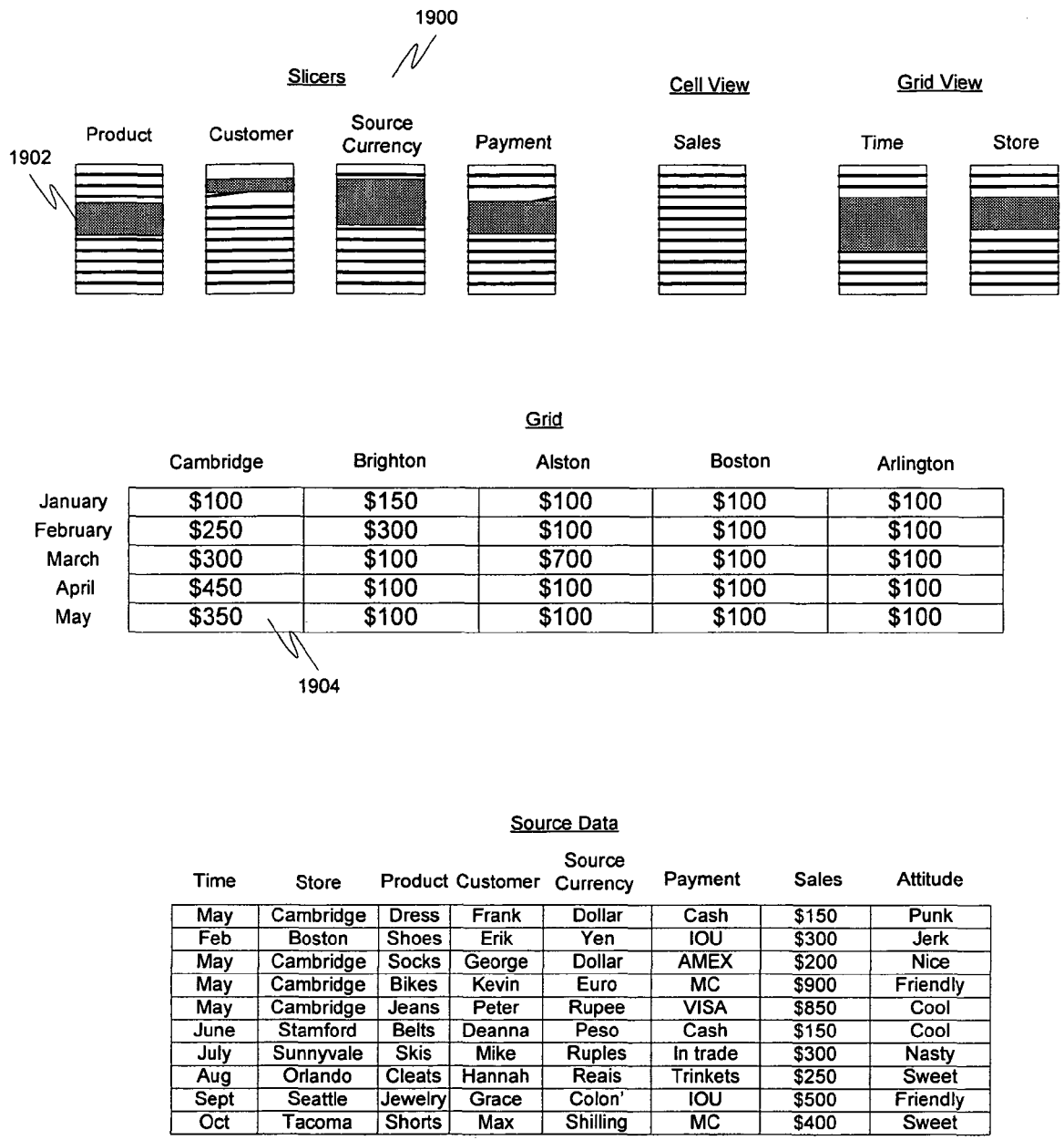
FIG. 19 is a diagram illustrating a viewing mechanism for source data in accordance with an embodiment of the present invention.

FIG. 19 is a diagram illustrating a viewing mechanism for source data in accordance with an embodiment of the present invention. In this figure, an embodiment is depicted where the multiple values to be displayed in a single cell are of types that allow aggregation, such as numeric values. Here, slicer dimensions 1900 permit a range 1902 of values to be selected for each dimension. This range of values may then be applied to the data before it is aggregated to be placed into a cell. Thus, as opposed to being able to only select a range for time and store, such as "May" and "Cambridge", the user is also able to select a range of Products, such as "dresses" and "socks" to which to limit the data to be displayed in the corresponding cells. Therefore, as opposed to showing an aggregated total of $2100 for "May" and "Cambridge" as depicted in FIG. 18, here the aggregated total 1904 for "May" and "Cambridge" is $350, as only the values for the products "dresses" and "socks" were included in the aggregation. The same applies to each of the slicer dimensions 1900. This allows for a very effective interface to allow users to view data across variable slicer dimensions and ranges.

Figure 20:
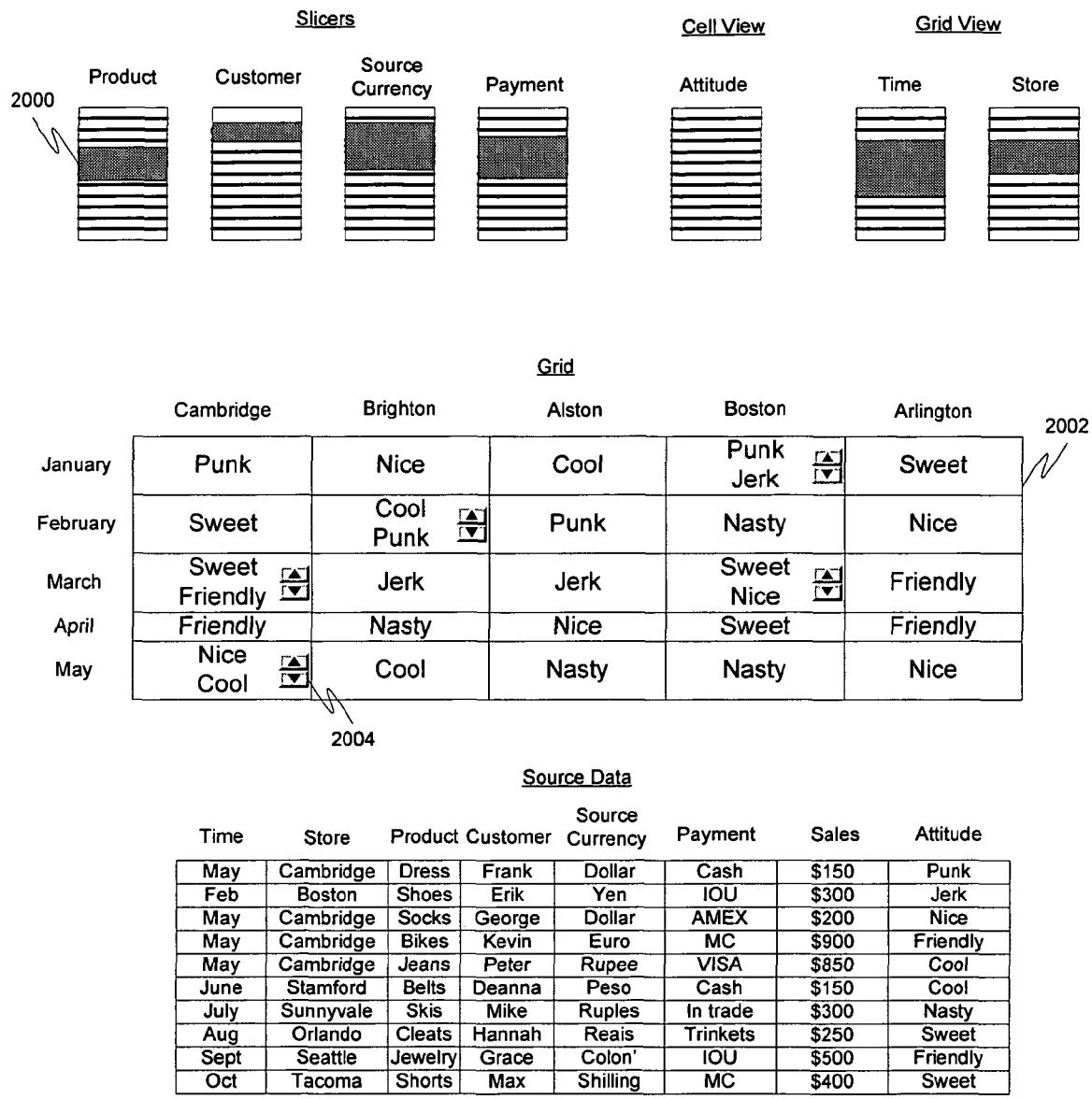
FIG. 20 is a diagram illustrating a viewing mechanism for source data in accordance with another embodiment of the present invention.

FIG. 20 is a diagram illustrating a viewing mechanism for source data in accordance with another embodiment of the present invention. In this figure, an embodiment is depicted where the multiple values to be displayed in a single cell are not to be aggregated. There can be several reasons why multiple values are not to be aggregated. For example, the values may be of a type that does not support aggregation, or at least clean aggregation, such as names. Additionally, the user could simply decide he does not want the value aggregated. Here, the values are of the former type, each being attitude labels. The slicer dimension ranges 2000 may be applied to the data in the same way as is FIG. 19. However, since the values to be displayed in the cells of the grid 2002 cannot be cleanly aggregated, the specific instances are listed for each cell using a navigation control 2004. It should be noted that each cell may contain independent navigation and sizing controls to allow each cell to take on a life of its own. In essence, each cell becomes a window onto one or more rows of one or more columns of data in the underlying table. It should also be noted that the variably sized cell windows then each contain arbitrary derived variables and formulas.

In both embodiments, the slicers are allowed to be more complex than standard slicing mechanisms, including have a range of selected values. The underlying construct of the slicers then may identify the count of and the specific values associated with the current cell and with the current grid. Since there may be many slice values associated with a particular cell or grid, a scrolling mechanism may also be required (not depicted in the figures).

Each embodiment may also be improved with a further enhancement that would allow the user to be able to drill through to the underling table from the slicer as easily as from the grid view.

Finally, another optional enhancement may be for the system to leverage its knowledge of semi-orthogonal locators to guide the user's navigation decisions. For example, if in FIG. 19, the user wanted to drag products below time and customer below stores, the system would know which, if any, ranges of values for store.customer (as two dimensions mapped in a hierarchical relationship to a single axis), and time.product (as two other dimensions mapped in a hierarchical relationship to the other axis), will produce dense views on the screen and display them as the default view.

Figure 21:
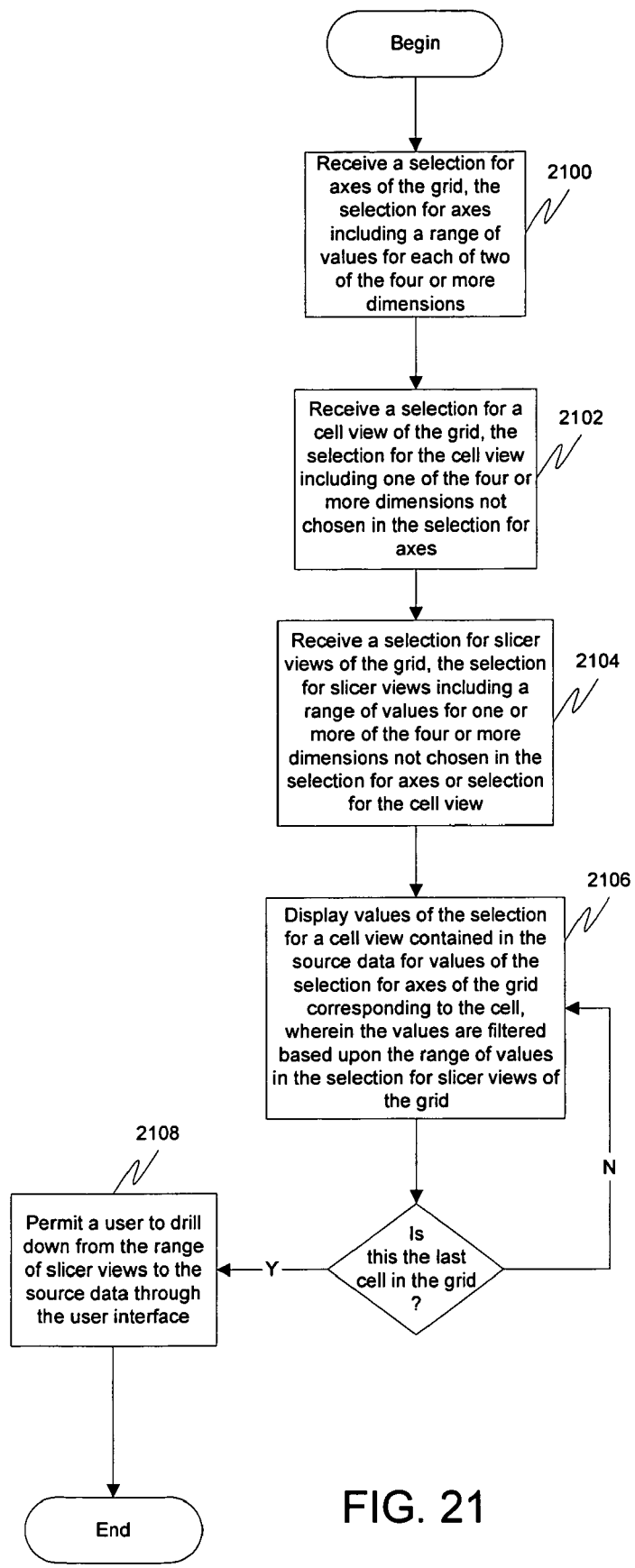
FIG. 21 is a flow diagram illustrating a method for displaying source data in a two-dimensional grid in a user interface in accordance with an embodiment of the present invention.

FIG. 21 is a flow diagram illustrating a method for displaying source data in a two-dimensional grid in a user interface in accordance with an embodiment of the present invention. The source data may have four or more dimensions, such that the user may select two of them to be axes on the grid, and one of them to be the cell view in the grid, and still be left with one or more dimensions to be used as slicer dimensions. At 2100, a selection for axes of the grid may be received, the selection for axes including a range of values for each of two of the four or more dimensions. This selection may be received directly from a user via a user interface, or may be received from some other source, such as a software component performing automatic selection. At 2102, a selection for a cell view of the grid may be received, the selection for the cell view including one of the four or more dimensions not chosen in the selection for axes. This selection may also be received directly from a user via a user interface, or from some other source.

At 2104, a selection for slicer views of the grid may be received, the selection for slicer views including a range of values for one or more of the four or more dimensions not chosen in the selection for axes or selection for the cell view (i.e., one or more of the remaining dimensions). If the selection is to be received directly from a user via a user interface, it may take place after the displaying of ranges for the slicer views of the grid in the user interface, and after permitting the user to edit the ranges graphically through the user interface. The displaying of the ranges for the slicer views may include displaying ranges that are likely to produce dense views as default slicer ranges in the user interface.

At 2106, for each cell of the grid, values of the selection for a cell view contained in the source data for values of the selection for axes of the grid corresponding to the cell may be displayed, wherein the values are filtered based upon the range of values in the selection for slicer views of the grid. In one embodiment of the present invention, this may include aggregating the filtered values into a single aggregated value for display in the cell. In another embodiment of the present invention, this may include listing all of the filtered values in the cell along with a navigational control that allows the user to scroll between values in the cell. The displaying may also include making the cell resizable by the user.

At 2108, the user may be permitted to drill down from the ranges of slicer views to the source data through the user interface.

Figure 22:
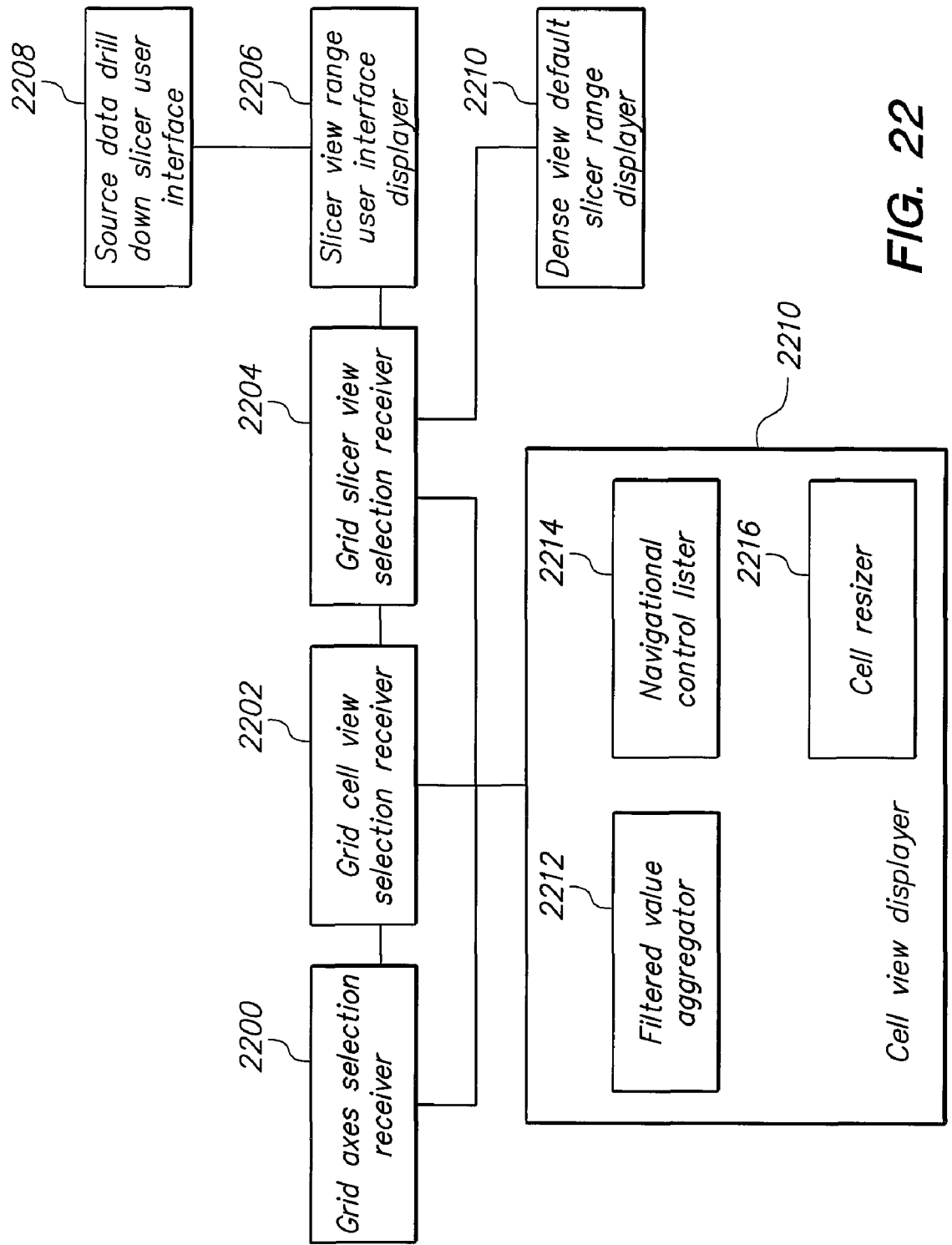
FIG. 22 is a block diagram illustrating an apparatus for displaying source data in a two-dimensional grid in a user interface in accordance with an embodiment of the present invention.

FIG. 22 is a block diagram illustrating an apparatus for displaying source data in a two-dimensional grid in a user interface in accordance with an embodiment of the present invention. The source data may have four or more dimensions, such that the user may select two of them to be axes on the grid, and one of them to be the cell view in the grid, and still be left with one or more dimensions to be used as slicer dimensions. A grid axes selection receiver 2200 may receive a selection for axes of the grid, the selection for axes including a range of values for each of two of the four or more dimensions. This selection may be received directly from a user via a user interface, or may be received from some other source, such as a software component performing automatic selection. A grid cell view selection receiver 2202 may receive a selection for a cell view of the grid, the selection for the cell view including one of the four or more dimensions not chosen in the selection for axes. This selection may also be received directly from a user via a user interface, or from some other source.

A grid slicer view selection receiver 2204 may receive a selection for slicer views of the grid may be received, the selection for slicer views including a range of values for one or more of the four or more dimensions not chosen in the selection for axes or selection for the cell view (i.e., one or more of the remaining dimensions). If the selection is to be received directly from a user via a user interface, it may take place after the displaying of ranges for the slicer views of the grid in the user interface, and after permitting the user to edit the ranges graphically through the user interface, both accomplished using a slicer view range user interface displayer 2206 coupled to the grid slicer view selection receiver 2204. The displaying of the ranges for the slicer views may include displaying ranges that are likely to produce dense views as default slicer ranges in the user interface using a dense view default slicer range displayer 2208 coupled to the grid slicer view selection receiver 2204.

For each cell of the grid, a cell view displayer 2210 coupled to the grid axes selection receiver 2200, the grid cell view selection receiver 2202, and the grid slicer view selection receiver 2204 may display values of the selection for a cell view contained in the source data for values of the selection for axes of the grid corresponding to the cell, wherein the values are filtered based upon the range of values in the selection for slicer views of the grid. In one embodiment of the present invention, this may include using a filtered value aggregator 2212 to aggregate the filtered values into a single aggregated value for display in the cell. In another embodiment of the present invention, this may include using a filtered value and navigational control lister 2214 to list all of the filtered values in the cell along with a navigational control that allows the user to scroll between values in the cell. The displaying may also include making the cell resizable by the user using a cell resizer 2216.

A source data drill down slicer user interface 2218 coupled to the slicer view range user interface displayer 2206, the user may be permitted to drill down from the ranges of slicer views to the source data through the user interface.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for presenting a view of data in a multidimensional database the method comprising:
assigning aggregate measures of orthogonality to one or more combinations of two or more columns in the multidimensional database;
wherein each aggregate measure of orthogonality indicates a measure of interdependence between values in a first column and values in one or more other columns;
identifying a region of orthogonality in the multidimensional database,
wherein, for one or more rows of the multidimensional database, values for a first set of one or more columns are not fully orthogonal in relation to values for a second set of one or more columns;
wherein said region is a subset of rows, from the one or more rows, for which values of the first set of one or more columns are orthogonal to values of the second set of one or more columns;
determining a view of data based at least upon said aggregate measures of orthogonality and said region of orthogonality, said determining including determining an orthogonal basis for the view;
wherein said view is of a subset of data in the multidimensional database;
wherein said orthogonal basis is one or more columns of the multidimensional database selected based on the aggregate measures of orthogonality and said region of orthogonality; and
displaying said view of data.

2. The method of claim 1, wherein the step of assigning aggregate measures of orthogonality comprises scanning a sampling of data from a source table in the multidimensional database,
wherein said view comprises a certain value that is found in the set of all data in the source table but is not found in the sampling of data from the source table.

3. The method of claim 1, wherein said step of assigning includes calculating orthogonality indices for each column in the combinations of two or more columns.

4. The method of claim 3, wherein said calculating includes:
a) selecting a distinct value in the column;
b) selecting all the rows having said distinct value for the column;
c) selecting a sister column different from the column;
d) calculating a count ratio equal to a count of distinct values for said sister column in said rows, divided by a count of overall distinct values for said sister column;
e) repeating b), c), and d) for each additional distinct value in said column; and
f) averaging said count ratios.

5. The method of claim 4, wherein said calculating begins with a column forming a likely orthogonal complete basis and advances to a next column by selecting a column forming a likely fully orthogonal complete basis, if available.

6. The method of claim 1, wherein said step of assigning includes:
determining that the product of distinct counts in each column for a particular permutation of columns is equal to an overall count of rows for said columns; and
wherein said step of determining a view includes concluding that said particular permutation forms a likely fully orthogonal complete basis;

7. The method of claim 1, wherein a low mean of absolute values of differences between individual counts and mean counts, divided by mean count, is less than 10%.

8. A computer-implemented method for presenting a view of data in a multidimensional database having one or more rows and one or more columns, the method comprising:
identifying a region of orthogonality in the multidimensional database,
wherein, for the one or more rows of the multidimensional database, values for a first set of one or more columns are not fully orthogonal in relation to values for a second set of one or more columns;
wherein said region is a subset of rows, from the one or more rows, for which values of the first set of one or more columns are orthogonal to values of the second set of one or more columns;
determining a view of the data based upon said region of orthogonality;
displaying said view.

9. The method of claim 8, wherein said identifying includes, for a first column and a second column, each of said columns having one or more distinct values:
a) creating a nested array whose outer elements are said distinct values for said first column and whose inner elements are said distinct values for said second column;
b) ranking values of said outer elements of said nested array by a count of entries in each of their associated inner elements;
c) creating a sister nested array whose outer elements are said distinct values for said second column and whose inner elements are said distinct values for said first column;
d) ranking values of said outer elements of said sister nested array by a count of entries in each of their associated inner elements;
e) selecting a row having the highest rank in said nested array;
f) determining which distinct values in said inner elements of said selected row of said nested array are high ranked values of said outer elements of said sister nested array;
g) unioning said distinct values of said outer elements of said selected row of said nested array with the cumulative union of all higher ranked rows, if any;
h) intersecting said distinct values of said inner elements of said selected row of said nested array that were determined to have high ranks in said outer elements of said sister nested array with the cumulative intersection of all higher ranked rows.

10. The method of claim 8, wherein said identifying is performed only with respect to columns that are not keys and that do not form part of a fully orthogonal basis.

11. The method of claim 8, wherein said identifying begins with a column pair having a highest orthogonality index as determined from a structure of orthogonality indices.

12. A program storage device readable by a machine, tangibly embodying a program of instructions executable by the machine to perform a method for presenting a view of data in a multidimensional database, the method comprising:
assigning aggregate measures of orthogonality to one or more combinations of two or more columns in the multidimensional database;
wherein each aggregate measure of orthogonality indicates a measure of interdependence between values in a first column and values in one or more other columns;
identifying a region of orthogonality in the multidimensional database,
wherein, for one or more rows of the multidimensional database, values for a first set of one or more columns are not fully orthogonal in relation to values for a second set of one or more columns;
wherein said region is a subset of rows, from the one or more rows, for which values of the first set of one or more columns are orthogonal to values of the second set of one or more columns;
determining a view of data based at least upon said aggregate measures of orthogonality and said region of orthogonality, said determining including determining an orthogonal basis for the view;
wherein said view is of a subset of data in the multidimensional database;
wherein said orthogonal basis is one or more columns of the multidimensional database selected based on the aggregate measures of orthogonality and said region of orthogonality; and
displaying said view of data.

13. The method of claim 1, wherein the orthogonal basis is a fully orthogonal complete basis, a fully orthogonal partial basis, or a semi-orthogonal partial basis.

14. The method of claim 1, wherein:
said step of assigning comprises determining that a count of distinct values in a first column multiplied by a count of distinct values in a second column is less than or equal to a count of all rows in a source table for said first column and second column; and
said step of determining a view comprises concluding that the first column and the second column do not, in combination, form an orthogonal basis.

15. The method of claim 1, wherein:
said step of assigning comprises the step of determining a first column having a count of distinct values equal to a count of rows in a source table for said first column;
said step of determining a view comprises concluding that the first column, by itself, is an orthogonal basis.

16. The method of claim 6, wherein said assigning further includes the steps of:
ranking columns by mean of absolute values of differences between individual counts and mean counts, divided by mean count;
selecting said permutation of columns based on those ranked columns having a low mean of absolute values of differences between individual counts and mean counts, divided by mean count.

17. The method of claim 9, wherein said identifying includes:
creating an orthogonal view size for said selected row; and
initializing said orthogonal view size to a distinct count of said first column multiplied by a distinct count of said second column.

18. The method of claim 8, wherein said identifying includes unioning and intersecting local regions of orthogonality to discover orthogonal zones of three or higher dimensions.

19. The method of claim 8, wherein said identifying comprises identifying orthogonal tuples.

20. The program storage device of claim 12, wherein the step of assigning aggregate measures of orthogonality comprises scanning a sampling of data from a source table in the multidimensional database,
wherein said view comprises a certain value that is found in the set of all data in the source table but is not found in the sampling of data from the source table.

21. The program storage device of claim 12, wherein the method further comprises:
identifying a region of orthogonality in the multidimensional database,
wherein, for one or more rows of the multidimensional database, values for a first set of one or more columns are not fully orthogonal in relation to values for a second set of one or more columns;
wherein said region is a subset of rows, from the one or more rows, for which values of the first set of one or more columns are orthogonal to values of the second set of one or more columns; and
wherein said step of determining a view further includes determining a view of data based at least upon said region of orthogonality.

22. The program storage device of claim 12, wherein said step of assigning includes calculating orthogonality indices for each column in the combinations of two or more columns.

23. The program storage device of claim 22, wherein said calculating includes:
a) selecting a distinct value in a column;
b) selecting all rows having said distinct value for the column;
c) selecting a sister column different from the column;
d) calculating a count ratio equal to a count of distinct values for said sister column in said rows, divided by a count of overall distinct values for said sister column;
e) repeating b), c), and d) for each additional distinct value in said column; and
f) averaging said count ratios.

24. The program storage device of claim 23, wherein said calculating begins with a column forming a likely orthogonal complete basis and advances to a next column by selecting a column forming a likely fully orthogonal complete basis, if available.

25. The program storage device of claim 12, wherein said step of assigning includes:
determining that the product of distinct counts in each column for a particular permutation of columns is equal to an overall count of rows for said columns; and
wherein said step of determining a view includes concluding that said particular permutation forms a likely fully orthogonal complete basis;

26. The program storage device of claim 25, wherein said assigning further includes the steps of:
ranking columns by mean of absolute values of differences between individual counts and mean counts, divided by mean count;
selecting said permutation of columns based on those ranked columns having a low mean of absolute values of differences between individual counts and mean counts, divided by mean count.

27. The program storage device of claim 26, wherein a low mean of absolute values of differences between individual counts and mean counts, divided by mean count, is less than 10%.

28. The program storage device of claim 12, wherein the orthogonal basis is a fully orthogonal complete basis, a fully orthogonal partial basis, or a semi-orthogonal partial basis.

29. The program storage device of claim 12, wherein:
said step of assigning comprises determining that a count of distinct values in a first column multiplied by a count of distinct values in a second column is less than or equal to a count of all rows in a source table for said first column and second column; and
said step of determining a view comprises concluding that the first column and the second column do not, in combination, form an orthogonal basis.

30. The program storage device of claim 12, wherein: said step of assigning comprises the step of determining a first column having a count of distinct values equal to a count of rows in a source table for said first column; said step of determining a view comprises concluding that the first column is an orthogonal basis.

31. The program storage device of claim 12, wherein said identifying includes, for a first column and a second column, each of said columns having one or more distinct values:
a) creating a nested array whose outer elements are said distinct values for said first column and whose inner elements are said distinct values for said second column;
b) ranking values of said outer elements of said nested array by a count of entries in each of said outer elements of said nested array's associated inner elements;
c) creating a sister nested array whose outer elements are said distinct values for said second column and whose inner elements are said distinct values for said first column;
d) ranking values of said outer elements of said sister nested array by a count of entries in each of said outer elements of said sister nested array's associated inner elements;
e) selecting a row having the highest rank in said nested array;
f) determining which distinct values in said inner elements of said selected row of said nested array are high ranked values of said outer elements of said sister nested array;
g) unioning said distinct values of said outer elements of said selected row of said nested array with the cumulative union of all higher ranked rows, if any;
h) intersecting said distinct values of said inner elements of said selected row of said nested array that were determined to have high ranks in said outer elements of said sister nested array with the cumulative intersection of all higher ranked rows.

32. The program storage device of claim 31, wherein said identifying includes:
creating an orthogonal view size for said selected row; and
initializing said orthogonal view size to a distinct count of said first column multiplied by a distinct count of said second column.

33. The program storage device of claim 12, wherein said identifying is performed only with respect to columns that are not keys and that do not form part of a fully orthogonal basis.

34. The program storage device of claim 12, wherein said identifying begins with a column pair having a highest orthogonality index as determined from a structure of orthogonality indices.

35. The program storage device of claim 12, wherein said identifying includes unioning and intersecting local regions of orthogonality to discover orthogonal zones of three or higher dimensions.

36. The program storage device of claim 12, wherein said identifying comprises identifying orthogonal topics.

* * * * *